(12) United States Patent
Jakubowski et al.

(10) Patent No.: US 7,694,473 B2
(45) Date of Patent: Apr. 13, 2010

(54) WIND ENERGY PLANT TOWER

(75) Inventors: Alexander Jakubowski, Bottrop (DE); Joachim Nitzpon, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 36 days.

(21) Appl. No.: 11/938,471

(22) Filed: Nov. 12, 2007

(65) Prior Publication Data
US 2009/0000227 A1   Jan. 1, 2009

(30) Foreign Application Priority Data
Jun. 28, 2007   (DE) .................. 10 2007 031 065

(51) Int. Cl.
E04C 5/08   (2006.01)
(52) U.S. Cl. .................. 52/223.4; 52/223.14; 52/296; 52/223.13
(58) Field of Classification Search .............. 52/223.14, 52/651.01, 152, 146, 150, 223.1, 698, 699, 52/295, 296, 223.4, 223.5
See application file for complete search history.

(56) References Cited

U.S. PATENT DOCUMENTS

| | | | | |
|---|---|---|---|---|
| 3,299,644 A | * | 1/1967 | White ...................... 405/230 |
| 3,501,881 A | * | 3/1970 | Van Buren ................. 52/223.4 |
| 3,899,892 A | * | 8/1975 | Yokota et al. ............. 405/259.5 |
| 3,967,421 A | * | 7/1976 | Dufossez ..................... 52/146 |
| 3,971,177 A | * | 7/1976 | Endo ........................ 52/166 |
| 4,052,595 A | * | 10/1977 | Erdmann et al. ............... 377/9 |
| 4,162,596 A | * | 7/1979 | Damman ..................... 52/295 |
| 4,166,347 A | * | 9/1979 | Pohlman et al. ............ 52/223.4 |
| 4,250,681 A | * | 2/1981 | Helderman .................. 52/704 |
| 4,583,336 A | * | 4/1986 | Shelangoskie et al. ........ 52/250 |
| 4,862,992 A | * | 9/1989 | Melfi ........................ 181/210 |
| 4,878,160 A | * | 10/1989 | Reneau et al. ............... 362/269 |
| 4,899,499 A | * | 2/1990 | Hoekstra ..................... 52/146 |
| 5,222,313 A | * | 6/1993 | Dowdy et al. ................ 36/138 |
| RE34,350 E | * | 8/1993 | Dufossez ..................... 52/146 |
| 5,274,115 A | * | 12/1993 | Papenfuhs et al. ............ 548/461 |
| 5,274,517 A | * | 12/1993 | Chen ....................... 360/98.08 |
| 5,289,626 A | * | 3/1994 | Mochida et al. ............... 29/452 |
| 5,406,769 A | * | 4/1995 | Vidal et al. ................. 52/745.1 |
| 5,878,540 A | * | 3/1999 | Morstein ..................... 52/296 |
| 6,647,678 B1 | * | 11/2003 | Zambelli et al. ............... 52/252 |
| 6,655,097 B1 | * | 12/2003 | Poolaw ..................... 52/127.2 |
| 6,931,805 B2 | * | 8/2005 | Gregory et al. ............... 52/296 |

(Continued)

FOREIGN PATENT DOCUMENTS

DE   101 26 912 A1   12/2002

(Continued)

Primary Examiner—Richard E Chilcot, Jr.
Assistant Examiner—Alp Akbasli
(74) Attorney, Agent, or Firm—Vidas, Arrett & Steinkraus

(57) ABSTRACT

A wind energy plant tower with a tower portion made of a concrete material and a steel-made tubular tower segment, which has on its foot a plurality of connection bores for the connection to the tower portion made of the concrete material, wherein the tower portion made of the concrete material has a head portion with a plurality of openings and a plurality of anchor bolts are provided, which can be fastened after the completion of the tower portion made of the concrete material each at a time in or on one of the connection bores on the foot of the steel-made tower segment and one of the openings in the head portion.

13 Claims, 2 Drawing Sheets

U.S. PATENT DOCUMENTS

| | | | |
|---|---|---|---|
| 7,155,875 B2 * | 1/2007 | Henderson | 52/741.15 |
| 7,174,684 B2 * | 2/2007 | Nuetzel et al. | 52/223.13 |
| 7,181,890 B2 * | 2/2007 | Nuetzel | 52/223.13 |
| 7,275,347 B2 * | 10/2007 | Hayes | 52/223.13 |
| 7,287,355 B2 * | 10/2007 | Commins | 52/223.14 |
| 7,343,718 B2 * | 3/2008 | Foust et al. | 52/745.17 |
| 2002/0050113 A1 * | 5/2002 | Peacock | 52/704 |
| 2002/0083652 A1 * | 7/2002 | Hughes | 52/2.11 |
| 2002/0108329 A1 * | 8/2002 | Bournand et al. | 52/223.13 |
| 2003/0000165 A1 * | 1/2003 | Tadros et al. | 52/223.4 |
| 2004/0065030 A1 * | 4/2004 | Zambelli et al. | 52/223.13 |

FOREIGN PATENT DOCUMENTS

| | | |
|---|---|---|
| DE | 102 30 273 B3 | 12/2004 |
| DE | 20 2006 009 554 U | 7/2006 |
| EP | 1 654 480 B1 | 2/2005 |

* cited by examiner

WIND ENERGY PLANT TOWER

CROSS-REFERENCE TO RELATED APPLICATIONS

Not applicable

STATEMENT REGARDING FEDERALLY SPONSORED RESEARCH

Not applicable.

BACKGROUND OF THE INVENTION

The present invention is related to a wind energy plant tower with a tower portion made of a concrete material and a steel-made tubular tower segment, which has on its foot a plurality of connection bores for the connection to the tower portion made of the concrete material.

Wind energy plant towers are frequently made completely from steel, with the exception of a foundation. However, with increasing size of the wind energy plant towers, a very large diameter of the tower is required for sufficient stability, in its lower region in particular. From on a certain diameter, significant difficulties in the manufacture and the transportation of the tower segments occur. This results in a high logistic expense and in high costs.

These difficulties can be avoided by making a lower tower portion from a concrete material. The same can consist of prefabricated parts and be composed at the construction site, or it can be completely made at the construction site by casting. On this tower portion made of a concrete material, an additional steel-made tower portion is set up, which may consist of one or several tubular tower segments. Particular attention has to be paid to the connection of the tower portion made of concrete with the lower end of the steel-made tower portion. Different solutions for this connection are known in the state of the art.

In the variant known from the document EP 1 654 460 B1, the entire contents of which is incorporated herein by reference, a lower portion of the tubular tower segment arranged on the lower end of the steel-made tower portion is cast in into an embedding region of the wall of the tower portion made from concrete when casting the tower portion made of concrete Special anchoring elements are fixedly connected with the steel-made tower segment and are intended to improve the stability of the connection between concrete and steel.

In the document DE 20 2006 009 554 U1, the entire contents of which is incorporated herein by reference, it is proposed to use a steel-made special adapter element, which is cast together with the concrete-made tower. In doing so, the adapter element is essentially annular and it encloses the upper end of the concrete-made tower portion. On the upper side of the adapter element, a tubular steel-made tower segment is fastened via a flange joint.

From the document DE 102 30 273 B3, the entire contents of which is incorporated herein by reference, the use of an adapter element is also known. The same is also annular and is connected on its upper end to a tubular steel-made tower segment via a flange joint. The tower portion arranged below the adapter consists of prestressed concrete, wherein prestressing elements run in the interior of the wall of the lower tower portion and are lead through connection bores of the adapter element. Above the adapter element, the prestressing elements are anchored, so that they pretension the adapter element stably with the concrete-made tower portion.

A similar solution is known from the document DE 101 26 912 A1, the entire contents of which is incorporated herein by reference, wherein here, either a separate steel-made adapter element or a suitably shaped lowermost steel-made tower segment is pretensioned with the prestressing elements of the concrete-made tower portion. As a peculiarity, the prestressing elements are arranged inside the tubular shaped concrete-made tower portion.

It is common to all the described realisations that the steel-made tower segment or a separate adapter element is cast together with the concrete-made tower portion or is prestressed with the prestressing elements for the concrete-made tower portion.

Based on this, it is the objective of the present invention to provide a wind energy plant tower which can be erected, serviced and as the case may be repaired more simply and with lower cost, as well as a method for the erection of such a tower.

BRIEF SUMMARY OF THE INVENTION

The wind energy plant tower of the present invention has a tower portion made of a concrete material and a tubular steel-made tower segment, which has on its foot a plurality of connection bores for the connection to the tower portion made of the concrete material, wherein the tower portion made of the concrete material has a head portion with a plurality of openings and a plurality of anchor bolts are provided, which can be fastened after the completion of the tower portion made of the concrete material each at a time in or on one of the connection bores on the foot of the steel-made tower segment and one of the openings in the head portion.

The tower portion made of a concrete material can consist of any arbitrary concrete material, for instance ferroconcrete or prestressed concrete. It may be composed of plural prefabricated portions or be cast on the construction site. The tubular steel-made tower segment can form the upper part of the wind energy plant tower and it may extend up to a bearing for the nacelle of the wind energy plant. However, it may also form only the lowermost part of a steel-made tower portion, which has further steel-made tower segments. The tubular steel-made tower segment can have an arbitrary cross section and can be formed cylindrical or conical in parts or in total.

The head portion consists also of a concrete material and is preferably formed integrally with the tower portion made of the concrete material. The openings in the head portion serve for the accommodation of anchor bolts, which produce the connection to the tubular steel-made tower segment.

The anchor bolts can be fastened in or on the connection bores on the foot of the steel-made tower segment and in or on the openings in the head portion. For this purpose, they can be screwed into corresponding counter threads in the connection bores on the foot of the steel-made tower segment or they can be lead through these connection bores and be secured with a nut. The anchor bolts can have a thread on one or on both ends.

After the completion of the tower portion made of the concrete material, the anchor bolts can be fastened, i.e. the connection to the tubular steel-made tower segment needs to be made only when the tower portion made of the concrete material is already completed. In this context, "completed" means that the tower portion made of the concrete material has reached its definite stability and carrying capability, in particular, that the concrete material is completely hardened and that it has optionally be prestressed with a pretension by means of suitable prestressing elements. Thus, the production of the concrete-made tower portion is completely uncoupled from the connection with the steel-made tower segment. In the erection of the wind energy plant tower, this results in the fact that the works on the tower portion made of the concrete material can be completed irrespective of the availability of the steel-made tower segment or of a separate adapter element. Those skilled in the art indebted with the erection of the tower portion made of the concrete material can rapidly complete their work, and the production and supply of the steel-made tower components can optionally take place at a later point in time.

A further advantage with respect to a construction with a cast-in adapter element is that this cost-intensive assembly part can be completely avoided.

It has to be emphasized that in contrast to the variants known in the state of the art, the tubular steel-made tower segment can also be detached from the tower portion made of the concrete material as the case may be, without impairing the stability or integrity of the tower portion made of the concrete material. In particular, individual anchor bolts can be replaced without problems, when this is necessary due to corrosion, for instance.

The fastening of the anchor bolts in the openings in the head portion can also take place in an arbitrary manner. In a preferred embodiment, the anchor bolts can be lead through one opening in the head portion each at a time and can be anchored on a side of the opening which is turned away from the steel-made tower segment. In this case, with the openings in the head portion it is matter of through openings. The anchoring of the anchor bolts on the side of the steel-made tower segment turned away from the opening can be effected by a nut or a corresponding head of the anchor bolt, for instance.

According to one embodiment, at least one anchoring plate is arranged on those ends of the openings in the head portion which are turned away from the steel-made tower segment. The anchoring plate may be ring- or disc-shaped and it can be made up of one or more segments. The anchoring plate has bores corresponding to the openings in the head portion, into which the anchor bolts can be inserted or through which the anchor bolts can be lead through. The bores can be circular bores in particular. With the aid of such an anchoring plate, a particularly heavy duty anchoring of the anchor bolts on the head portion can be achieved.

In one embodiment, the openings in the head portion have cladding tubes, which are cast together with the concrete material. In this, the cladding tubes preset in a simple manner the arrangement and the form of the openings in the head portion when casting the head portion. Thus, precisely arranged and heavy duty openings are provided in a simple manner.

In one embodiment, on an upper side of the head portion there is arranged a load distribution plate. The load distribution plate is preferably made of steel and has a disc- or annular shape. It can consist of several segments. The load distribution plate can be cast together with the head portion or it can set up after the completion of the concrete-made tower portion. The load distribution plate provides a planar contact surface for the foot of the steel-made tower segment and it distributes the loads appearing in this to a greater surface of the head portion. It has bores for the anchor bolts, which can be executed as circular, slantly bored holes or as straightly bored longholes.

According to one embodiment, the openings in the head portion are cylindrical and run towards the longitudinal axis of the tower portion made of the concrete material in the direction of those ends thereof which are turned away from the steel-made tower segment. In this alignment of the openings in the head portion tilted with respect to the longitudinal axis of the tower portion made of the concrete material, the end thereof which is turned away from the steel-made tower segment is easily accessible. In particular, these ends can be accessible from the interior even at a great wall thickness of the tower portion made of the concrete material. At the same time, the end of the openings which face the steel-made tower segment can be arranged near the outer perimeter of the head portion. Through this, a higher solidness of the joint can be achieved with concomitant good accessibility to the anchor bolts.

According to one embodiment, the connection bores in the foot of the steel-made tower segment are arranged in a flange, which radially projects towards the inside from a wall of the steel-made tower segment. In contrast to a flange turned outward, a flush closing-off of the outer wall of the steel-made tower segment with the outer wall of the tower portion made of concrete material can be achieved in this arrangement. In addition, the anchor bolts are completely arranged in the interior of the tower and thus they are easily accessible and protected against corrosion. In particular, the connection bores can be executed as slantly bored, circular holes or as straightly bored longholes in the flange. When the anchor bolts are slantly lead through the flange, a wedge-shaped washer can be arranged above the flange.

In one embodiment, the tower portion made of the concrete material has plural prestressing elements, which prestress the tower portion made of the concrete material. In this embodiment, the concrete is relieved from tensile stresses in the manner usual with prestressed concrete.

Preferably, in the region of the head portion, the prestressing elements are arranged offset in the radial direction with respect to the openings in the head portion. Through this, the prestressing elements are easily accessible and are not covered by a flange of the steel-made tower segment.

In one embodiment, the head portion has a portion, projecting radially towards the inside from the interior side of a wall of the tower portion made of the concrete material, and the openings in the head portion lead from an upper surface of the head portion towards a lower surface of the projecting portion. The projecting portion may be executed to be annular and circulating around the entire inner perimeter of the tower portion made of the concrete material or to be segment-wise. The portion projecting towards the interior permits an easily accessible and secure anchoring of the anchor bolts. In particular, the openings may be arranged such that the tower wall of the tower portion made of the concrete material is not impaired by the openings.

Preferably, the openings in the head portion are aligned vertical to the lower surface of the projecting portion. Through this, the anchor bolts anchored on this lower surface exert an uniform load on the concrete material of the head portion.

In one embodiment, the prestressing elements run through the portion of the head portion projecting radially towards the inside. The portion of the head portion projecting towards the inside provides a secure anchoring possibility for the prestressing elements. These are easily accessible from the inside in this arrangement. In the further course, the prestressing elements can be arranged section-wise or completely inside a wall of the tower portion made of the concrete material or they can be prestressed in the interior of a tubular formed tower portion made of the concrete material, for instance.

According to one embodiment, the prestressing elements are fixed on the upper side of the head portion and in the region of the lower end of the tower portion made from the concrete material. As the case may be, the fixation in the region of the end of the tower portion made of the concrete material may also take place in a foundation of the wind energy plant tower, which preferably also consists of a concrete material.

Advantageous embodiments of the method are indicated in the subclaims which follow.

The method of the present invention serves for erecting a wind energy plant tower, which has a tower portion made of a concrete material and a steel-made tubular tower segment, which is provided on its foot with a plurality of connection bores for the connection to the tower portion made of the concrete material, wherein in a first step, the tower portion made of the concrete material which has a head portion with a plurality of openings is completed and in a second step, the steel-made tower segment is connected with the tower portion made of the concrete material, wherein a plurality of anchor bolts are provided, which each at a time are fastened in or on one of the connection bores on the foot of the steel-made tower segment and one of the openings in the head portion.

The method simplifies the erection of a wind energy plant tower, because the tower portion made of a concrete material can be completed before any elements for a steel-made tower portion are needed. Moreover, the installation of the steel-made tower segment with the aid of the anchor bolts is substantially more simple than casting a separate adapter element during the production of the tower portion made of the concrete material. Further advantages of the method have already been explained in the description of the wind energy plant tower to be erected.

BRIEF DESCRIPTION OF THE SEVERAL VIEWS OF THE INVENTION

The present invention will be explained in more detail by means of an example of its realisation depicted in two figures.

DETAILED DESCRIPTION OF THE INVENTION

Figure 1:
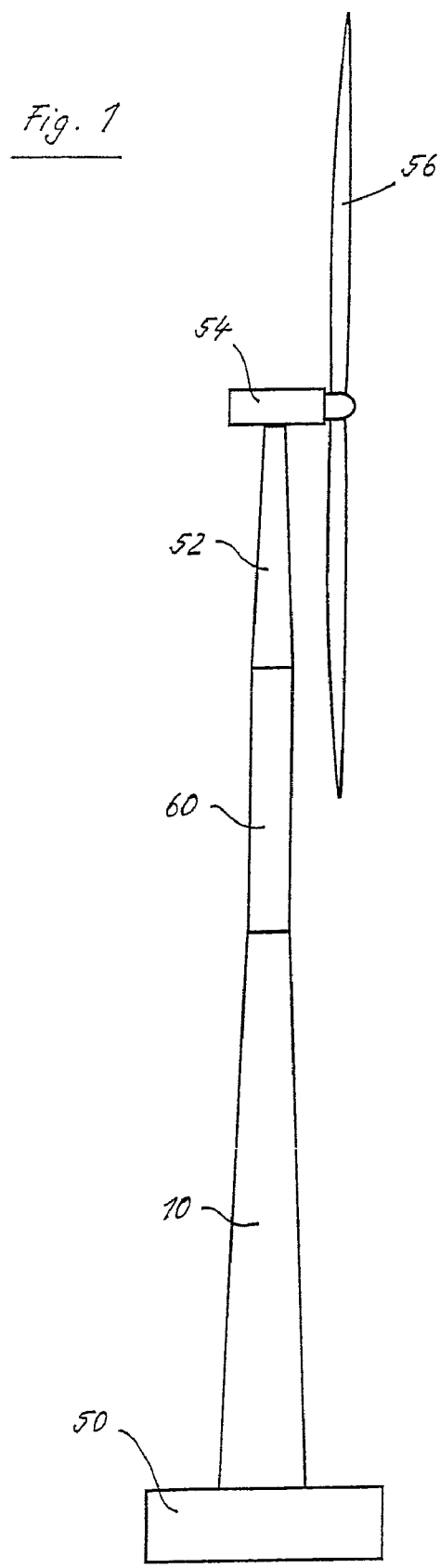
FIG. 1 shows a wind energy plant in a strongly simplified, schematic view.

While this invention may be embodied in many different forms, there are described in detail herein a specific preferred embodiment of the invention. This description is an exemplification of the principles of the invention and is not intended to limit the invention to the particular embodiment illustrated The wind energy plant depicted in FIG. 1 has a tower portion 10 made of ferroconcrete, which rests on a concrete foundation 50. Above the tower portion 10, there is a tubular steel-made tower segment 60, which is shaped circular cylindrical. A further steel-made tower segment 52 is conical and arranged above the tower segment 60. On its upper end, it has a bearing for the nacelle 54 of the wind energy plant. A rotor 56 with plural rotor blades is rotatably mounted on the nacelle 54. It drives a generator for providing electric power.

Figure 2:
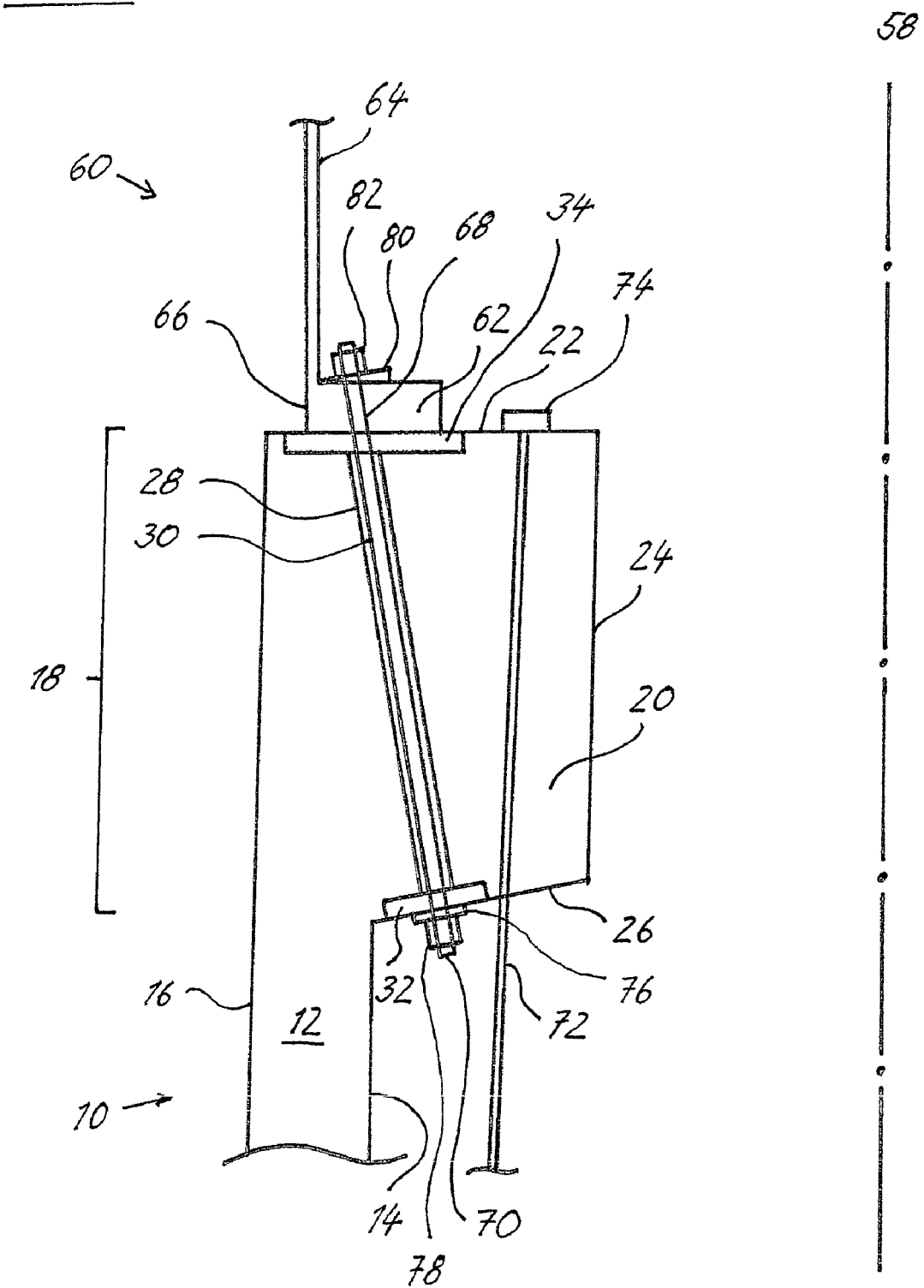
FIG. 2 shows a cross section in the region of the connection location between a tower portion made of a concrete material and a steel-made tower segment, in a plane running radially and along the longitudinal axis of the tower of the wind energy plant of FIG. 1.

The cross sectional presentation of FIG. 2 shows a cut-out of the connection location between the steel-made tower segment 60 and the tower portion made of the concrete material. The longitudinal axis of the tower is indicated in broken and dotted lines at 58; correspondingly, the outer side of the tower is situated on the left side of FIG. 2. Tower portion 10 and tower segment 60 are rotationally symmetrical with respect to the longitudinal axis 58.

The tower portion 10 made of the concrete material has a wall 12, which extends downward substantially up to the foundation 50. The wall 12 has an inner side 14 and an outer side 16. The upper end of the tower portion 10 made of the concrete material is formed by the head portion 18, which is made integrally with the wall 12 from the same concrete material. The head portion 18 is annular and has an upper surface 22, which confines the tower portion 10 towards the upside, a circular cylindrical opening 24 towards the inner side of the tower and a lower surface 26, which is inclined with respect to the upper surface 22 such that the thickness of the head portion 18 decreases towards the inside in the radial direction.

A plurality of cladding tubes 28 is concreted into the head portion 18, from which one lays in the plane of projection with its longitudinal axis in the cross sectional representation of FIG. 2. More cladding tubes 28 not visible in FIG. 2 are arranged at uniform distances along the perimeter of the head portion 18. Every cladding tube 28 encircles one opening 30 in the head portion 18. The ends of the openings 30 which are turned away from the steel-made tower segment 60 run out in corresponding bores of an anchor plate 32, which forms a conical ring which terminates about flush with the lower surface 26 of the head portion 18. The anchor plate 32 is cast together with the head portion 18.

A load distribution plate 34 is also cast together with the head portion 18, which is also annular and has a plurality of circular, slantly aligned bores, the arrangement of which corresponds to that one of the openings 30 in the head portion 18 which face the steel-made tower segment 60.

The upper surface of the annular load distribution plate 34 terminates about flush with the upper surface 22 of the head portion 18 and immediately adjoins a flange 62, which radially projects towards the inside from the wall 64 of the steel-made tower segment 60. The outer side 66 of the flange 62 terminates about flush with the outer side of the wall 64. The width of the flange 62 is smaller than the width of the load distribution plate 34, so that the load distribution plate 34 distributes the forces introduced into the head portion 18 via the flange 62 across a greater surface. Moreover, the flange 62 has a plurality of circular, slantly arranged connection bores 68, the arrangement and alignment of which corresponds to that one of the openings 30 in the head portion 18.

Anchor bolts 70 serve for the connection of the steel-made tower segment 60 and the tower portion 10 made of the concrete material. Each anchor bolt extends through a connection bore 68 in the flange 62, a bore in the load distribution plate 34, an opening 30 in the head portion 18, which is surrounded by a cladding tube 28, and a bore in the anchor plate 32. The longitudinal axis of the opening 30 is aligned vertical to the lower surface 26 of the head portion 18, as well as is the longitudinal axis of the anchor bolt 70. Below the anchor plate 32, the anchor bolt 70 is anchored with a washer 76 and a nut 78. Through the vertical alignment, washer 76 and nut 78 sit planar on the anchor plate 32 and thus they provide for secure anchoring of the anchor bolt 70 in the opening 30. Above the flange 62, the other end of the bolt 70 is secured with a wedge-shaped washer 80 and an additional nut 82.

In order to prestress the tower portion 10 made of the concrete material, there are several prestressing elements 72. Each prestressing element 72 runs through the portion 20 projecting radially towards the inside of the head portion 18 and is arranged offset towards the inside with respect to the openings 30. On the upper surface 22 of the head portion 18, the prestressing elements 72 are secured or prestressed, respectively, with a fixation- or prestressing equipment 74.

The prestressing elements 72 run towards the downside up to the foot of the tower portion 10 made of the concrete material, where they are securely anchored. Thus, they prestress substantially the entire tower portion 10 made of the concrete material.

The tower can be erected with the method of the present invention as follows. After the completion of the foundation 50, the tower portion 10 made of the concrete material is erected in a first step. In doing so, the wall 12 and the head portion 18 are produced by casting a not shown steel reinforcement with concrete. In doing so, even the cladding tubes 28, the anchor plate 32 and the load distribution plate 34 as well as the upper ends of the prestressing elements 72 or additional cladding tubes suited for the accommodation of the anchor bolts 72, respectively, are cast in. After the hardening of the concrete, the prestressing elements 72 are prestressed, so that the tower portion 10 made of the concrete material is prestressed according to schedule and has reached its definite stability. With this, the tower portion 10 made of the concrete material is completed. At a later point in time, the steel-made tower segment 60 is set up on the load distribution plate 34 and fixedly screwed together with the head portion 18 by means of the anchor bolts 70.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant tower with a tower portion (10) made of a concrete material and a steel-made tubular tower segment (60), which has on its foot a plurality of connection bores (68) for connection to the tower portion (10) made of the concrete material, characterized in that the tower portion (10) made of the concrete material has a head portion (18), a portion (20) of the head portion (18) projecting radially inwardly, the tower portion (10) having a plurality of openings (30), such that a plurality of anchor bolts (70) are provided, which can be fastened after the completion of the tower portion (10) made of the concrete material each at a time in or on one of the connection bores (68) on the foot of the steel-made tower segment (60) and one of the openings (30) in the head portion (18).

2. A wind energy plant tower according to claim 1, characterized in that the anchor bolts (70) can be lead through one opening (30) in the head portion (18) each at a time and can be anchored on a side of the opening (30) which is turned away from the steel-made tower segment (60).

3. A wind energy plant tower according to claim 1, characterized in that at least one anchoring plate (32) is arranged on those ends of the openings (30) in the head portion (18) which are turned away from the steel-made tower segment (60).

4. A wind energy plant tower according to claim 1, characterized in that the openings (30) in the head portion (18) have cladding tubes (28), which are cast together with the concrete material.

5. A wind energy plant tower according to claim 1, characterized in that on an upper side (22) of the head portion (18) there is arranged a load distribution plate (34).

6. A wind energy plant tower according to claim 1, characterized in that the openings (30) in the head portion (18) are cylindrical and run towards the longitudinal axis (58) of the tower portion (10) made of the concrete material in the direction of those ends thereof which are turned away from the steel-made tower segment (60).

7. A wind energy plant tower according to claim 1, characterized in that the connection bores (68) in the foot of the steel-made tower segment (60) are arranged in a flange (62), which radially projects towards the inside from a wall (64) of the steel-made tower segment (60).

8. A wind energy plant tower according to claim 1, characterized in that the tower portion (10) made of the concrete material has plural prestressing elements (72), which prestress the tower portion (10) made of the concrete material.

9. A wind energy plant tower according to claim 8, characterized in that in the region of the head portion (18), the prestressing elements (72) are arranged offset in the radial direction with respect to the openings (30) in the head portion (18).

10. A wind energy plant tower according to claim 1, characterized in that the portion (20) of the head portion (18) projecting radially inwardly projects from the interior side (14) of a wall (12) of the tower portion (10) made of the concrete material, and the openings (30) in the head portion (18) lead from an upper surface (22) of the head portion (18) towards a lower surface (26) of the projecting portion (20).

11. A wind energy plant tower according to claim 10, characterized in that the openings (30) in the head portion (18) are aligned vertical to the lower surface (26) of the projecting portion (20).

12. A wind energy plant tower according to claim 10, characterized in that the prestressing elements (72) run through the portion (20) of the head portion (18) projecting radially towards the inside.

13. A wind energy plant tower according to claim 8, characterized in that the prestressing elements (72) are fixed on the upper side of the head portion (18) and in the region of the lower end of the tower portion (10) made from the concrete material.

* * * * *